United States Patent [19]
Yaworsky et al.

[11] Patent Number: 5,400,491
[45] Date of Patent: Mar. 28, 1995

[54] APPARATUS FOR REPAIRING A COMBUSTION CHAMBER ASSEMBLY

[75] Inventors: Chester E. Yaworsky, Glastonbury; Galen H. Reed, Colchester, both of Conn.

[73] Assignee: United Technologies Corporation, Hartford, Conn.

[21] Appl. No.: 91,798

[22] Filed: Jul. 14, 1993

[51] Int. Cl.⁶ .......................... B23Q 1/14; B23C 3/04
[52] U.S. Cl. .................... 29/33 R; 29/33 K; 219/121.67; 409/165
[58] Field of Search .............. 29/33 R, 33 K, 889.1, 29/889.21, 889.22, 890.01; 51/241 R, 245, 241 B; 219/121.67; 409/165, 202, 212

[56] References Cited

U.S. PATENT DOCUMENTS

| | | | |
|---|---|---|---|
| 4,741,128 | 5/1988 | Reaves et al. | 29/889.1 X |
| 4,805,282 | 2/1989 | Reaves et al. | 29/889.1 |
| 4,819,313 | 4/1989 | Dadhich | 29/889.22 |
| 5,205,465 | 4/1993 | Bogard et al. | 29/889.1 X |

FOREIGN PATENT DOCUMENTS 795708 1/1981 U.S.S.R. .............. 29/889.1

*Primary Examiner*—William Briggs
*Attorney, Agent, or Firm*—Gene D. Fleischhauer

[57] ABSTRACT

A repair apparatus 78 for repairing the combustion chamber assembly 32 of a gas turbine engine 20 is disclosed. Various construction details are developed which increase the speed of the repair process and the structural integrity of the repaired combustion chamber assembly. In one particular embodiment, the repair apparatus has a support assembly 82 which is adapted by locating pins 98 to engage the lug mountings 48 of the combustion chamber assembly 32.

8 Claims, 4 Drawing Sheets

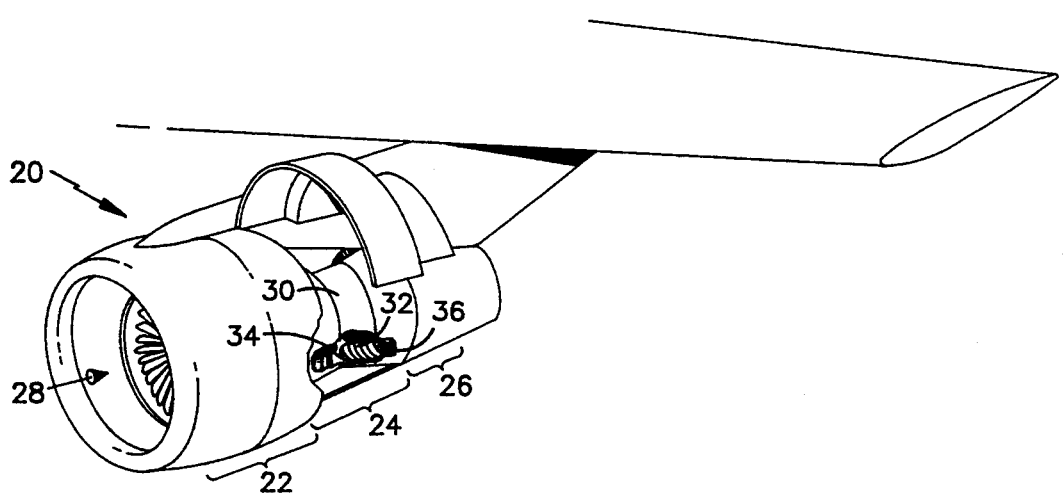
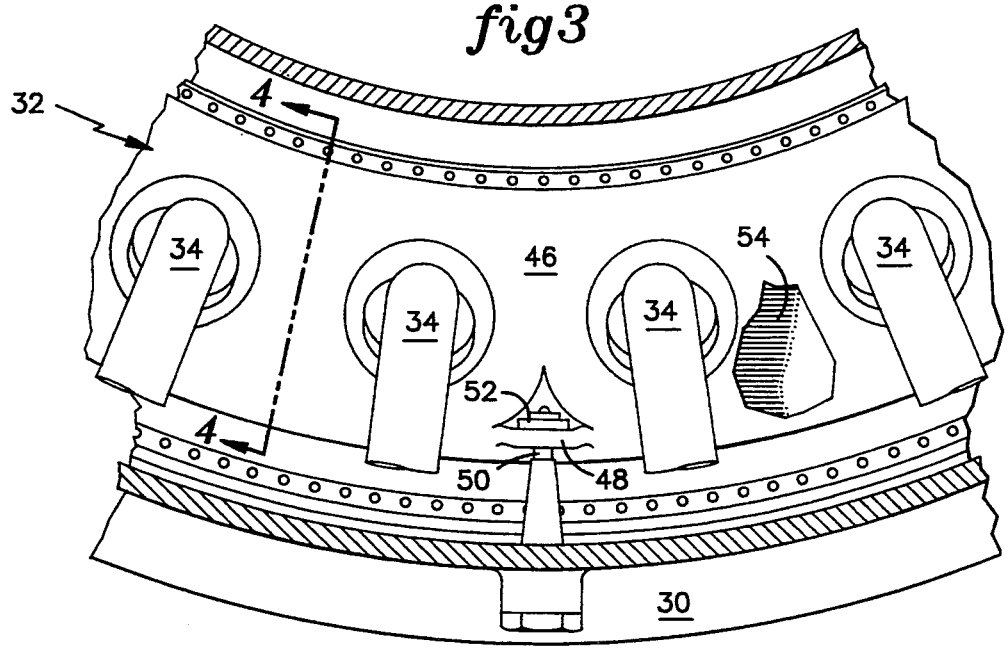

APPARATUS FOR REPAIRING A COMBUSTION CHAMBER ASSEMBLY

TECHNICAL FIELD

This invention relates to the repair of a gas turbine engine and more particularly to an apparatus for utilization in conjunction with a method for repairing a combustion chamber assembly for such an engine. The present invention was developed for use in repairing an axial flow gas turbine engine.

BACKGROUND

An axial flow gas turbine engine includes a compression section, a combustion section and a turbine section. The engine has a rotating rotor assembly. The rotor assembly includes a rotor disk-blade assembly which extends axially through the compression section, a rotor disk-blade assembly which extends axially through the turbine section, and a rotor shaft which extends axially connecting the rotor disk-blade assembly in the turbine section to the rotor disk-blade assembly in the compression section. A stationary stator assembly extends axially through the compression section and the turbine section of the engine. The stator assembly includes a case which circumscribes the rotor assemblies, supports which extend radially inwardly from the case for supporting the rotor assemblies, and stator vanes which extend radially inwardly from the case at a location upstream of each rotor assembly. The stator vanes prepare the gases for entry into an associated rotor disk-blade assembly.

A flow path for working medium gases extends axially through the sections of the engine. As the gases are flowed along the flow path, the gases are compressed in the compression section and burned with fuel in the pressurized combustion section to add energy to the gases. The gases flow to the turbine section where the rotor disk-blade assembly converts the energy in the gases into power to drive the compressor by turning the rotor shaft. The compressor and turbine sections have a special configuration, but only that of the combustion section is of interest here.

The combustion section includes a combustion chamber assembly extending circumferentially about an axis of symmetry. The combustion chamber assembly has an upstream end and a downstream end. The combustion chamber assembly includes an inner combustion chamber wall and an outer combustion chamber wall which extend between the ends. The walls are spaced radially leaving an annular combustion zone therebetween. The outer wall has holes disposed around its circumference at predetermined locations for admitting air for cooling and for the combustion process. A bulkhead assembly at the upstream end extends between the walls to join the walls together. The bulkhead assembly includes an inner ring, an outer ring and a bulkhead which extends radially between the two rings. The bulkhead is welded to the inner ring and outer ring to form an integral part.

The bulkhead has a first surface facing upstream and a second surface facing downstream. A dome-shaped hood for the combustion chamber extends over the upstream end of the combustion chamber assembly covering the first surface of the bulkhead. A plurality of lug mountings are an integral part of the hood and adapt the combustion chamber assembly for attachment in the engine. A plurality of openings are disposed circumferentially about the hood and the bulkhead. Each opening adapts the combustion chamber assembly to receive an associated fuel nozzle. Each fuel nozzle extends through the hood and the bulkhead for spraying fuel into the combustion chamber assembly.

A guide for each fuel nozzle is disposed in each opening in the bulkhead. The guides are spaced axially and spaced radially from the bulkhead leaving a passage for cooling air therebetween. A support, which is generally cylindrical in shape and extends upstream toward the combustion hood, is attached to the bulkhead and the guide to support the guide from the bulkhead. An anti-rotation element extends between each fuel nozzle and each support to restrain the fuel nozzle against rotation.

It is critical to the operative life of the engine that the angle of each fuel nozzle in relation to the lug mountings remains within predetermined limits. If the nozzle is positioned incorrectly, fuel may be sprayed onto the combustion chamber assembly walls, and the walls may be burned.

In order to repair the walls of the combustion chamber assembly individual wall elements are patched, replaced, or welded. Welding of minor cracks in the walls is standard procedure. Also, some of the dilution and combustion holes may need repairing. Patching or repairing these holes in the walls requires holes to be cut in the walls of the combustion chamber assembly. A type of holding apparatus, a vertical locating fixture, is used to measure the location for these local holes on the combustion chamber assembly and to hold the combustion chamber assembly while the holes are cut. The locating fixture uses the lug mountings of the combustion chamber assembly for support. The lug mountings are relatively strong in a direction parallel to the axis of the engine in comparison to the transverse direction, that is, the direction perpendicular to the axis of symmetry of the combustion chamber assembly.

The holes are cut utilizing a tool that has a chip formation action, such as, step drilling or end milling. The chip formation action exerts minimal transverse forces. Accordingly, the locating fixture exerts only enough force on the lug mountings to oppose the small transverse forces created by cutting local holes.

The locating fixture includes a base plate. An outer rim extends circumferentially about the plate and projects upwardly perpendicular to the plate. A plurality of pin holes extend radially through the outer rim of the plate. A plurality of locating pins extend through the pin holes, so that one locating pin extends through each pin hole. The locating pins adapt the fixture to engage the combustion chamber assembly by the lug mountings extending from the combustion chamber hood.

In addition to burning the walls, improper orientation of the fuel nozzles can cause further damage to the engine. The original engine has a temperature profile in the circumferential direction and the radial direction for the gases entering the high pressure turbine. The temperature profile of the gases exiting the combustion section around the annular combustion chamber assembly must substantially match a predetermined temperature profile for this to happen. Improper alignment of the fuel nozzles may cause the gases exiting the combustion section to have an altered temperature profile representing a temperature differential around the annulus, and/or the radius of the combustion chamber assembly. The gases exiting at a temperature profile substantially different than that of the original engine may excessively heat the rotor blades and the stator vanes in the turbine section causing the rotor blades and the stator vanes to oxidize and eventually fail. Typically, a repaired combustion chamber assembly may have a substantial temperature differential in its temperature profile. The temperature profile causes premature rotor blade and stator vane failure in the turbine section.

Accordingly, there is a inverse relationship between the quality of the repair and the rate of premature failure. Thus, the proper repair of the combustion chamber assembly each time it is repaired is vital to the durability the combustion chamber assembly and the turbine, and ultimately the performance of the aircraft.

The combustion chamber assembly is typically repaired two to three times in its life. Repairs may be performed on the supports for the fuel nozzle guides, the anti-rotation elements which rest on the supports, the openings for the fuel nozzle guides on the bulkhead and the walls of the combustion chamber assembly. Accessing the walls for repair operations, as described above, requires that the inner wall be removed. This provides access to components downstream of the bulkhead. Because the elements upstream of the bulkhead and areas on the upstream surface of the bulkhead needing repair are directly beneath the hood of the combustion chamber assembly, the industry practice is to remove the hood from the combustion chamber assembly to gain access to these damaged elements and areas.

Removing the hood is normally done by utilizing a cutting apparatus to make extensive cuts in the combustion chamber assembly. These cuts are wide because of the nature of the cutting wheel. A strong holding apparatus is used to resist the large forces developed during the cutting process. The first step is to mark an inside cut-line around the perimeter of the inner wall of the hood and to mark an outside cut-line around the perimeter of the outer wall of the hood. The next step is to place the combustion chamber assembly with the hood facing upwardly into the center of the cutting apparatus. Then the combustion chamber assembly is held firmly in place by a holding apparatus, such as a hydraulic sizing cluster.

The sizing cluster fits into the combustion chamber assembly and holds the combustion chamber assembly on its inner diameter at a position lower than the inside cut-line. The set-up of the sizing cluster is time consuming and difficult, because using the sizing cluster requires working with many small parts. Although the sizing cluster slows down the repair process, it has the ability to resist very large transverse forces exerted by the cutting wheel. Once the combustion chamber assembly is secure the cutting apparatus is used.

The cutting apparatus includes a crank arm, a fixed arm, an annular track and a cutting wheel. A gear system converts the rotary motion of turning the crank arm into the circumferential motion of the fixed arm traveling along the track. The cutting wheel is mounted on the end of the fixed arm. The cutting wheel is powered by an air system.

The cutting wheel is positioned along the inside cut-line and travels as many revolutions around the combustion chamber assembly as is necessary to separate the metal surfaces along the inside cut-line. The cutting wheel is then positioned along the outside cut-line and rotated until the metal surfaces separate. Because the cutting wheel uses an abrasive action to create the separations, the transverse forces created by it are far in excess of thoses created by the chip formation action used to repair the walls. Accordingly, the hydraulic sizing cluster is used because it exerts a large force to oppose the large transverse forces exerted by the cutting wheel even though it is time consuming to employ.

The above art notwithstanding, scientists and engineers working under the direction of applicants' assignee, are seeking to develop an apparatus for use in repairing combustion chamber assemblies which provides for an acceptable set-up time and which avoids massive cutting of the combustion chamber assembly to gain access to the bulkhead.

SUMMARY OF INVENTION

The present invention is in part predicated on the recognition that a method for cutting a combustion chamber assembly, which exerts small transverse forces when cutting enables utilizing the lug mountings to support and position the combustion chamber assembly. In particular, the present invention is predicated on the recognition that both the lug mountings and the vertical locating fixture, which engages the lug mountings, may resist substantial vertical forces and small transverse forces created during a circumferential cutting operation. The present invention is also predicated on the recognition that when performing the step of reattaching the bulkhead to the second portion of the combustion chamber assembly using a welding operation, the apparatus needs to circumferentially align the bulkhead very accurately, angularly align the bulkhead only approximately, cylindrically support the combustion chamber assembly and maintain the concentricity of the combustion chamber assembly.

According to the present invention, an apparatus for removing and installing a bulkhead during a repair operation for a combustion chamber assembly having an annular bulkhead, a hood capping the bulkhead and a plurality of lug mountings which extend from the hood, includes a support assembly for engaging the lug mountings to hold the combustion chamber assembly in position, includes a cutting device which exerts relatively small transverse forces on the lug mountings and whose principal reactant forces on the lug mountings place the lug mountings in compression and includes means for causing relative rotation between the combustion chamber assembly and the cutting device to effectuate separations along two circumferential paths which are radially spaced on the bulkhead for removing the bulkhead without stressing or deforming the lug mountings.

In accordance with one embodiment of the present invention the support assembly includes a plurality of angled plug holes and plugs, cooperating therewith, which engage the bulkhead during reattachment to precisely align the bulkhead circumferentially and to approximately align the bulkhead angularly.

A primary feature of the present invention is a base plate which engages the lug mountings for supporting and rotating the combustion chamber assembly during detachment of the bulkhead. Another feature of the present invention is a cutting device which exerts mimimal transverse forces on the lug mountings and whose principal reactant forces on the lug mountings place the lug mountings in compression. In one detailed embodiment the cutting device is a laser. Another feature is an element of the support assembly—means for indexing the bulkhead having an indexing plate, a plurality of plug holes and a plurality of plugs. A feature of one embodiment of the invention is a bung plate.

A primary advantage of the present invention is the efficiency and ease of a repair operation which results from supporting and rotating the combustion chamber assembly using an apparatus which engages the lug mountings. Another advantage is the enhanced durability and efficiency of the engine because the configuration of the repaired combustion chamber assembly is comparable to that of the original configuration which results from the apparatus positioning the bulkhead properly and which results from the apparatus maintaining the circular form and concentricity of the inner diameter of the combustion chamber assembly during welding of the bulkhead. In particular, the durability of the repaired combustion chamber assembly is enhanced by using an apparatus with the cutting operation which avoids stressing the lug mountings to the extent which causes their deformation or destruction. Yet another advantage of the present invention is the time and effort necessary to secure the combustion chamber assembly to the repair apparatus for cutting which results from simply engaging the lug mountings with the support assembly.

The foregoing features and advantages of the present invention will become more apparent in the light of the following detailed description of the best mode for carrying out the invention and in the accompanying drawing.

BRIEF DESCRIPTION OF THE DRAWING

FIG. 1 is a perspective view of a gas turbine engine mounted on an aircraft wing broken away to show interior portions of a combustion section and a turbine section.

FIG. 3 is an end view of the combustion chamber assembly partially broken away to show a fuel nozzle and a combustion chamber hood with interior portions of a bulkhead shown.

BEST MODE FOR CARRYING OUT THE INVENTION

Figure 2:
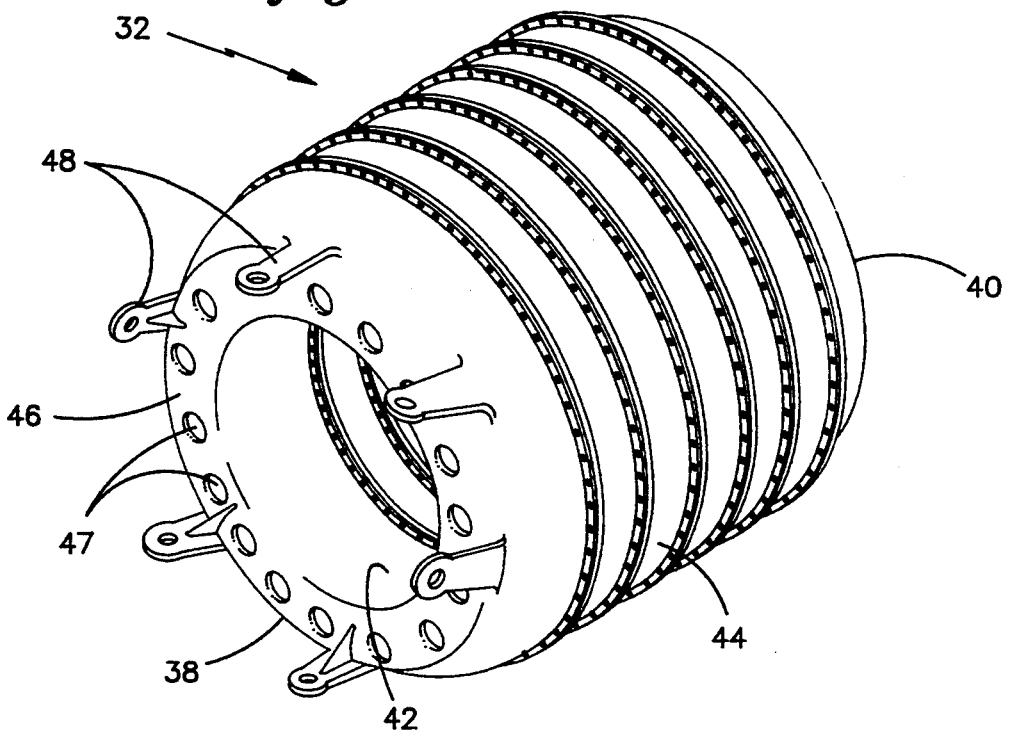
FIG. 2 is a perspective view in full of a combustion chamber assembly in an uninstalled condition.

FIG. 1 is a perspective view of a gas turbine engine 20 mounted on an aircraft wing. The engine includes a compression section 22, a combustion section 24 and a turbine section 26. An annular flow path 28 for working medium gases extends axially through these sections of the engine. An engine case 30 extends axially through the engine to bound the flow path.

The engine case 30 is partially broken away to show a portion of the combustion section 24 and the turbine section 26. The combustion section includes a combustion chamber assembly 32 and a plurality of fuel nozzles, as represented by the single fuel nozzle 34. The turbine section includes an array of stator vanes, as represented by the stator vane 36. The vanes extend radially across the flow path for gases at a location downstream of the combustion chamber. An array of rotor blades (not shown) are downstream of the combustion chamber assembly and extend radially at a location downstream of the array of stator vanes.

FIG. 2 is a perspective view in full of the combustion chamber assembly 32 in an uninstalled condition. The combustion chamber assembly has an upstream end 38 and a downstream end 40. The combustion chamber assembly has an inner combustion chamber wall 42 and an outer combustion chamber wall 44 which extend between the ends. The walls are capped by a combustion chamber hood 46. A plurality of openings 47 are disposed circumferentially about the hood. A bulkhead assembly (not shown) extends between the walls and lies directly beneath the hood. A plurality of lug mountings 48 are an integral part of the hood.

FIG. 3 is an end view of the combustion chamber assembly 32. The combustion chamber assembly and the engine case 30 are partially broken away for clarity. The plurality of lug mountings, as represented by the lug mounting 48, extend from the combustion chamber assembly. Each lug mounting is adapted to be attached to the engine case. In the embodiment shown, a pin 50 engages the case and the lug mounting and a bushing 52 protects the lug mounting from wear. The plurality of fuel nozzles 34 extend through the combustion chamber hood 46 and the bulkhead assembly 54 at a predetermined angle to spray fuel into the combustion chamber assembly.

Figure 4:
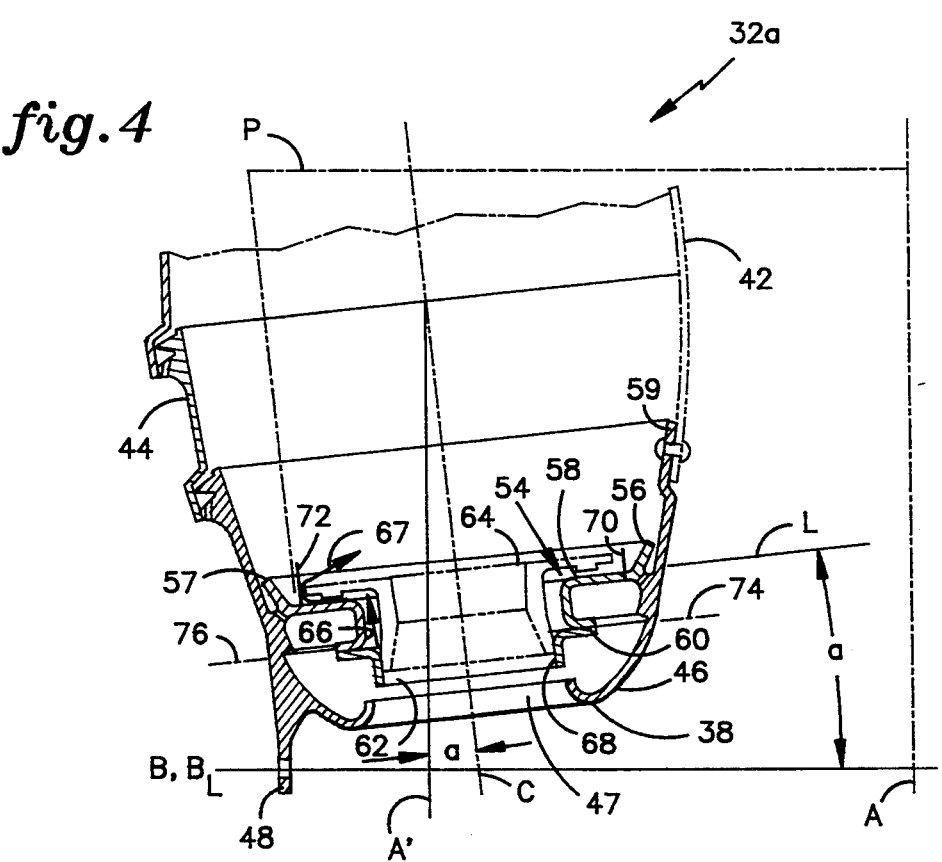
FIG. 4 is an enlarged side elevation view taken along the line 4—4 of the FIG. 3 showing the combustion chamber assembly as it appears during a repair operation after removal of an inner combustion chamber wall.

FIG. 4 is an enlarged side elevation view of a portion of the combustion chamber assembly 32a. The combustion chamber assembly has an axis of symmetry A. FIG. 4 shows the combustion chamber assembly as it appears during a repair operation after removal of the inner combustion chamber wall 42 (shown in phantom). Once the inner wall is removed, the remainder of the combustion chamber assembly forms the hooded bulkhead portion of the combustion chamber assembly 32a. The inner wall is integrally attached to the combustion chamber assembly, such as by rivets and is easily removed. The outer combustion chamber wall 44 is attached by welding.

The bulkhead assembly 54 extends between the two walls. The bulkhead assembly includes an inner ring 56, an outer ring 57 and a bulkhead 58 which extends between the two rings. The inner ring of the bulkhead assembly has an inner surface 59. The inner wall is riveted to the inner surface of the inner ring. The bulkhead has a first surface 60 which faces the upstream end 38 of the combustion chamber assembly. The combustion chamber hood 46 covers the first surface of the bulkhead and is attached to the lug mounting 48.

The plurality of openings, as represented by the opening 47, are disposed circumferentially about the hood 46. A plurality of openings, as represented by the opening 62, are disposed circumferentially about the bulkhead. Each opening adapts the combustion chamber assembly to receive an associated fuel nozzle 34, which in this Fig. is broken away for clarity. Each fuel nozzle extends through the hood and the bulkhead for spraying fuel into the combustion chamber assembly.

A plurality of guides, as represented by the guide 64 (shown in phantom), are each disposed in each opening 62 in the bulkhead 58. The guides are spaced axially and spaced radially from the bulkhead leaving a passage for cooling air 66 therebetween. A flow path 67 for cooling air extends through the passage. A plurality of supports, as represented by the support 68, are attached to the first surface 60 of the bulkhead and the guide. The supports join the guides to the bulkhead. The supports extend toward the upstream end 38 of the combustion chamber assembly and the hood 46. The combustion chamber assembly may include other elements which are not shown, such as, a plurality of anti-rotation elements extending between each fuel nozzle and each support to restrain the fuel nozzle against rotation.

The combustion chamber assembly has a reference plane B which is defined by three points, where each of the three points is at the same relative location on a separate lug mounting 48. A centerline C for the opening 62 for the fuel nozzle shows the orientation of the fuel nozzle with respect to the reference plane B. A reference line A' is a line parallel to the axis of symmetry A and intersects the line C.

A radial reference plane P contains the axis A and the line C. The plane P intersects the bulkhead 58 at a reference line L. The plane P intersects the plane B at a reference line $B_L$.

An angle between the reference line L and the reference line $B_L$ is the angle of the bulkhead (bulkhead angle) with respect to the reference plane B for the combustion chamber assembly. It is also equal to an angle a between the line C and the line A'. Therefore, the bulkhead angle represents the angle of the bulkhead in relation to the lug mountings. The bulkhead angle a in the originally manufactured combustion chamber assembly is precisely determined and in the embodiment shown measures about fifteen degrees (15°).

An inner separation region 70 and an outer separation region 72 extend circumferentially about the bulkhead. The separation regions are commonly referred to as the cut-lines. In the prior art repair method an inside cut-line 74 and an outside cut-line 76 were used.

Figure 5:
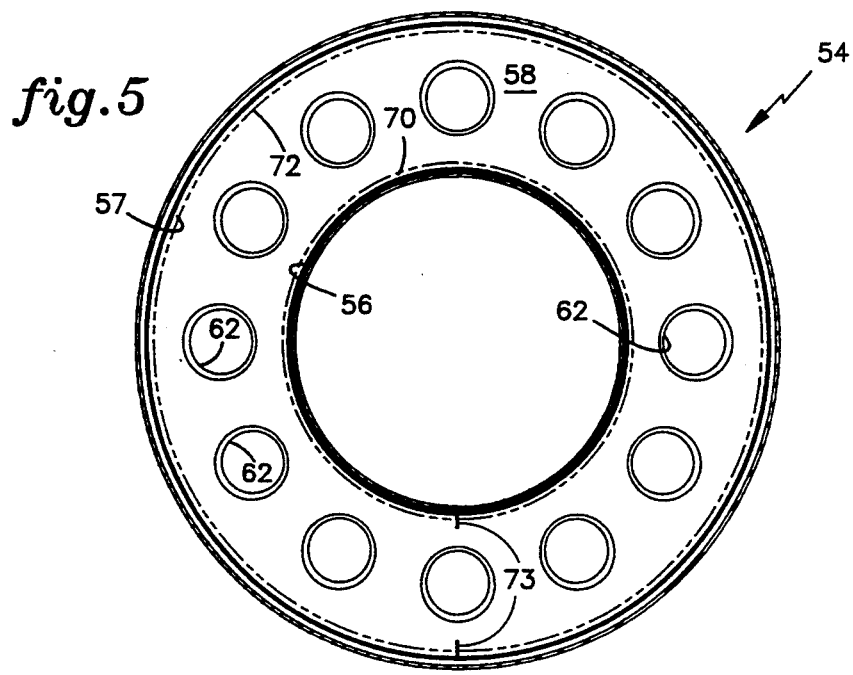
FIG. 5 is a cross-sectional view taken along the line 5—5 of FIG. 6 showing a cross-section of a bulkhead assembly.
Figure 6:
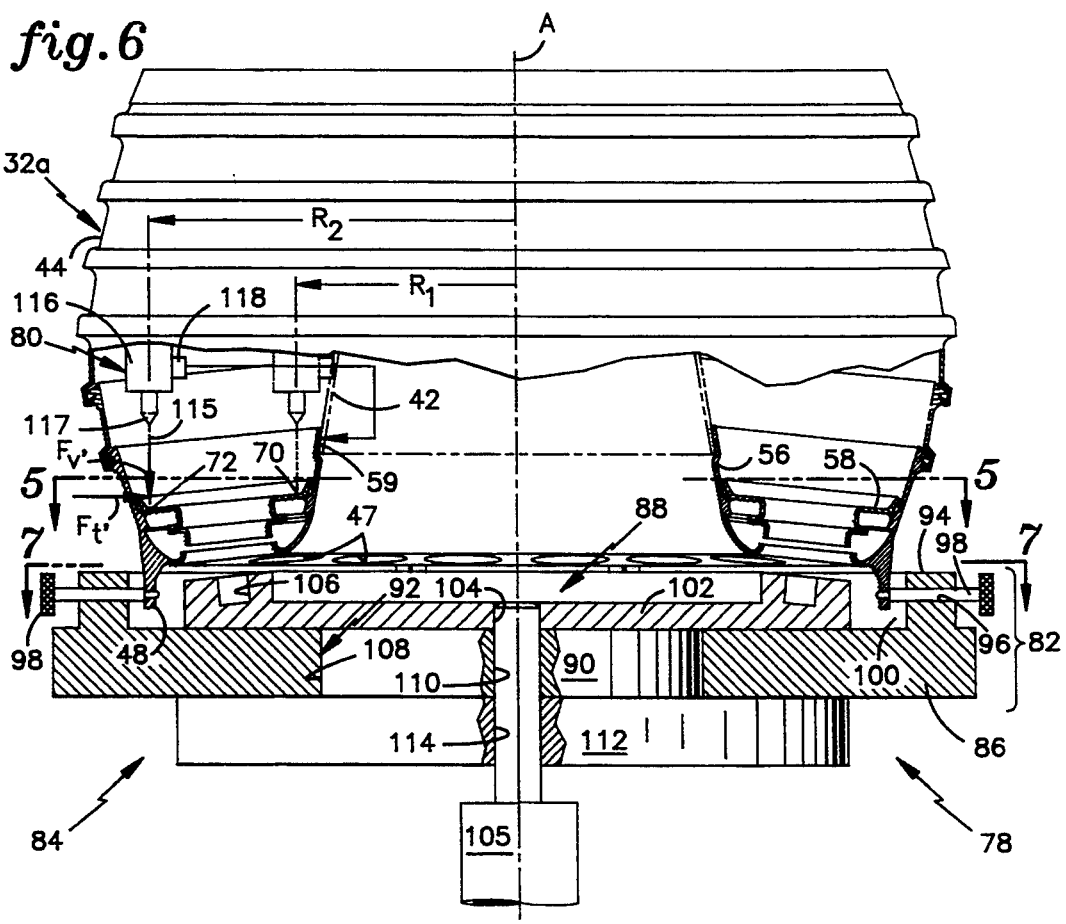
FIG. 6 is a side elevation view of a hooded bulkhead portion of the combustion chamber assembly with interior portions of the combustion chamber assembly broken away and shown as they appear during the repair operation.

FIG. 5 is a cross-sectional view of the bulkhead assembly 54 taken along line 5—5 of FIG. 6. The bulkhead assembly includes the inner ring 56 and the outer ring 57 joined by the bulkhead 58. The plurality of openings 62 for the fuel nozzles are disposed on the bulkhead. The bulkhead is separated along an inner circumference of the bulkhead at the cut-line 70, and along an outer circumference at the cut-line 72. Prior to separating the bulkhead, several reference lines 73 are drawn from the inner ring onto the bulkhead and the from the outer ring onto the bulkhead with a predetermined relationship to one another which assures the bulkhead is returned to the same circumferential position from which it was removed.

FIG. 6 is a side elevation view of the hooded bulkhead portion of the combustion chamber assembly 32a as it appears during a repair operation. The repair operation occur about the axis of symmetry A of the combustion chamber assembly. A repair apparatus 78 for rotating and supporting the hooded bulkhead portion of the combustion chamber assembly engages the lug mountings 48 of the hooded bulkhead portion of the combustion chamber assembly. The repair apparatus includes a cutting device 80 which is positioned within the combustion chamber assembly for cutting around the bulkhead 58. In the embodiment shown, the cutting device is a laser.

The repair apparatus 78 also includes a support assembly 82 and means for rotating the support assembly about the axis of the combustion chamber, such as, a rotator assembly 84. In the embodiment shown the support assembly includes a steel base plate 86, means for indexing the bulkhead 88 and an aluminum center plate member 90. In other embodiments, the support assembly may include the base plate and the means for indexing the bulkhead, where the center plate member has become an integral part of the base plate. The base plate 86 includes a center opening 92 which adapts the base plate for rotation about the axis of symmetry A. The base plate has an outer rim 94 which extends upwardly from the base plate and circumferentially about the base plate. A plurality of pin holes, as represented by the pin hole 96, extend through the outer rim of the base plate. A plurality of locating pins, as represented by the locating pin 98, extend through the pin holes. A cavity 100 between the outer rim of the base plate and the means for indexing the bulkhead 88 receives the lug mountings (not shown). The lug mountings are engaged by the locating pins. The locating pins may be threaded or unthreaded thus slidable in the pin hole.

The means for indexing the bulkhead 88 includes an indexing plate 102 which attaches to the base plate 86. The indexing plate has a center hole 104 which adapts the plate for inserting of a locating cylinder 105 through the indexing plate. In other embodiments, the indexing plate is rigidly attached to the base plate, such as by bolts, and by virtue of this rigid attachment the indexing plate is centered on the rotator assembly. A plurality of plug holes as represented by the plug hole 106, shown by the dotted lines, are disposed around the circumference of the indexing plate. A plurality of plugs, shown in FIG. 8, engage the plug holes of the indexing plate.

The center plate member 90 includes locating surfaces 108 which engage the base plate 86 in the base plate center opening 92. The center plate member has a center hole 110 for receiving the locating cylinder 105.

The support assembly has bolt holes (not shown) for rigidly attaching the support assembly to the rotator assembly 84. The rotator assembly includes the means for causing the relative rotation of the support assembly with respect to the cutting device 80, such as a turn table 112. The turn table has a center hole 114 for receiving the locating cylinder 105.

The cutting device 80 includes means for cutting a bulkhead, such as, a laser beam 115 and a positioning structure 116 for the laser beam. The positioning structure has a laser nozzle assembly 117 which forms the laser beam. The laser beam is formed through a lens (not shown). The laser beam a 25 transverse force characteristic $F_t$, which is perpendicular to the axis of the combustion chamber assembly. The laser beam has a vertical force characteristic $F_V$, which is parallel to the axis of the combustion chamber assembly. The positioning structure has a first radial position $R_1$ (shown in phantom) and a second radial position $R_2$. The first radial position coincides with the inner separation region 70 on the bulkhead 58. The second radial position coincides with the outer separation region 72. A dial indicator 118 is disposed adjacent to the hooded bulkhead portion of the combustion chamber assembly. The dial indicator is connected to a fixed support, as represented by the dial indicator connected to the laser positioning structure 116 by a magnet. The dial indicator picks up on the inner surface 59 of the inner ring 56 of the bulkhead assembly 54.

Figure 7:
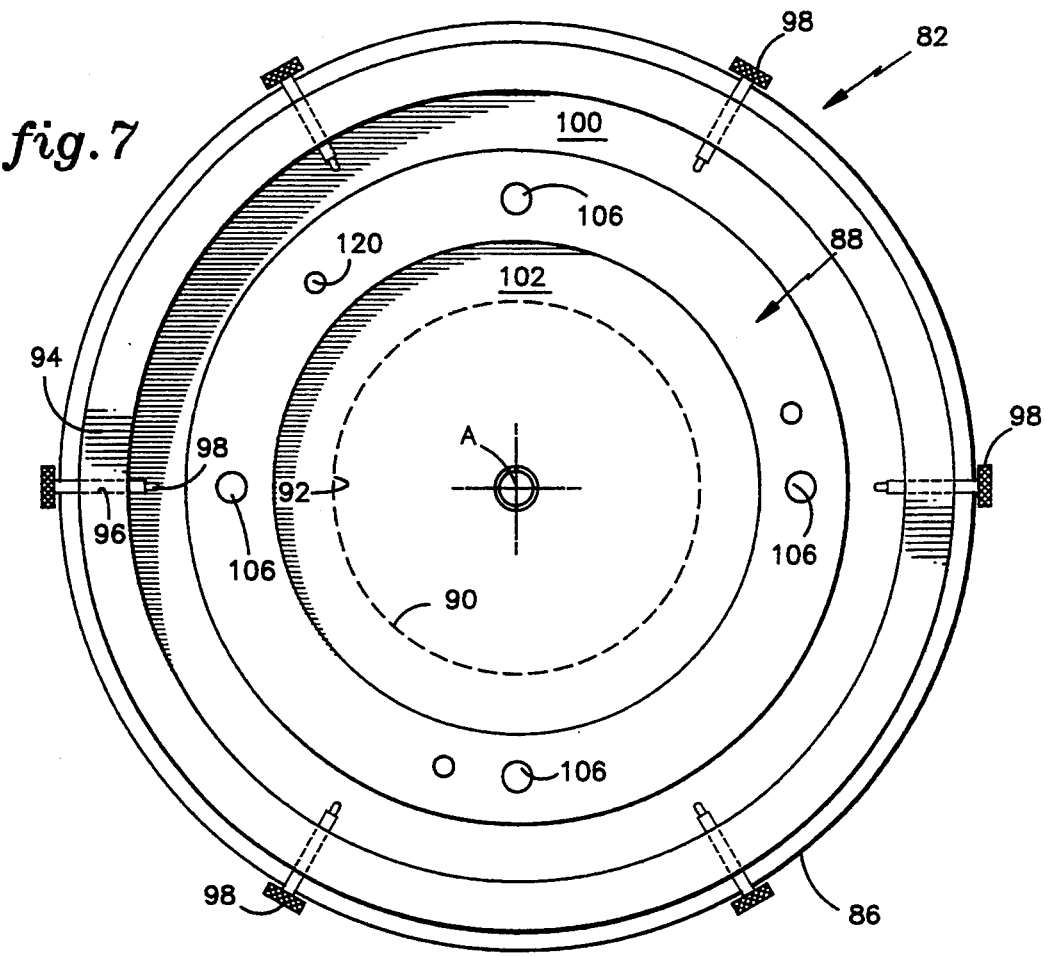
FIG. 7 is a cross-sectional view taken along line 7—7 of FIG. 6 showing a support assembly as it appears during the repair operation and the relationship between some of the elements of the support assembly that were discussed in FIG. 6.

FIG. 7 is a cross-sectional view taken along line 7—7 of FIG. 6 showing a support assembly 82 as it appears during a repair operation and the relationship between some of the elements of the support assembly that were discussed in FIG. 6. The support assembly holds the combustion chamber assembly 32 (not shown) in position. In the embodiment shown the support assembly includes the steel base plate 86, the means for indexing the bulkhead 88 and the center plate member 90.

The base plate 86 includes the center opening 92 which adapts the base plate for rotation about the axis of symmetry A of the combustion chamber assembly. The outer rim 94 extends upwardly from the base plate and circumferentially about the base plate. The pin holes 96 extend through the outer rim of the base plate. The locating pins 98 extend radially inwardly through the pin holes and have the relationship illustrated. The cavity 100 between the outer rim of the base plate and the means for indexing the bulkhead 88 receives the lug mountings 48. The lug mountings are engaged by the locating pins.

The means for indexing the bulkhead 88 includes the indexing plate 102 which attaches to the base plate 86. The plug holes 106 are disposed circumferentially about the indexing plate.

The base plate 86 and the indexing plate 102 of the support assembly each have a plurality of lifting holes 120 disposed circumferentially about the two plates. The base plate and the indexing plate of the support assembly have bolt holes (not shown) for rigidly attaching the support assembly to the rotator assembly (not shown).

The center plate member 90 engages the base plate 86 in the center opening 92 of the base plate.

The hole in the center of the support assembly extends through the center plate member 90 and the indexing plate 102 for receiving the locating cylinder (not shown).

Figure 8:
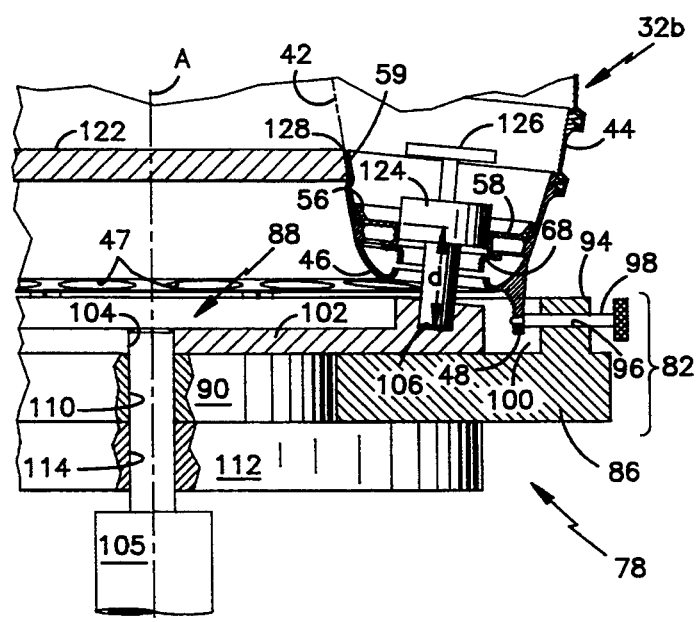
FIG. 8 is a side elevation view of the combustion chamber assembly as it appears during a procedure for reassembly of a bulkhead to a hooded portion of the combustion chamber assembly.

FIG. 8 is a side elevation view of a combustion chamber assembly 32b. FIG. 8 shows the combustion chamber assembly as it appears during a procedure for reattaching the bulkhead 58 to the hooded portion of the combustion chamber assembly 32b. Once the inner wall 42 and the bulkhead are removed, the remainder of the combustion chamber assembly forms the hooded portion of the combustion chamber assembly. FIG. 8 also clarifies the features of some of the elements of the support assembly of the repair apparatus that were discussed in FIGS. 6,7.

The repair apparatus 78 supports the hooded portion of the combustion chamber assembly 32b. The repair apparatus includes the support assembly 82, the rotator assembly 84 (not shown in FIG. 8 and shown in FIG. 6), the locating cylinder 105 and a bung plate 122. In the embodiment shown the support assembly includes the base plate 86, the means for indexing the bulkhead 88 and the center plate member 90.

As mentioned earlier, the means for indexing the bulkhead 88 has the plug holes 106 disposed around the circumference. Each plug hole has an angle parallel with the original bulkhead angle a, for orienting the bulkhead and a depth d for aligning the bulkhead with the surface adjacent to the inner ring 56 which remained attached to the combustion chamber assembly 32. The plugs 124 engage the plug holes for orienting and aligning the bulkhead in the reassembly of the combustion chamber assembly. Each plug has a hand knob 126 which extends outwardly from the plug to allow for the removal of the plug. Alternatively, any projection which allows for the removal of the plug would suffice.

The aluminum bung plate 122 has a surface 128 having a diameter which locates on the inner surface 59 of the inner ring 56 adjacent to the bulkhead position. The bung has several holes (not shown) disposed around the circumference of the bung plate for a device for inserting and removing the bung plate from the combustion chamber assembly.

During operation of the gas turbine engine shown in FIG. 1, gases are flowed along the flow path 28. As the gases are flowed along the flow path, the gases are compressed in the compression section 22 and burned with fuel in the pressurized combustion section 24 to add energy to the gases. The gases are flowed to the turbine section 26. The turbine section converts the energy in the gases into work and thrust.

The combustion section 24 includes the combustion chamber assembly 32. During the operation of the engine, the combustion chamber assembly is bathed in hot gases. These gases flowed through the combustion chamber assembly cause distress and cracking of parts of the combustion chamber assembly walls 42,44. The distress and cracking are due to forces exerted on the combustion chamber assembly and temperature cycles that accompany the operative conditions of the engine.

As shown in FIG. 4, The fuel nozzle guides 64 are each welded to an associated support 68. Cooling air is flowed along the flow path 67. The flow path for cooling air extends through a cooling air passage 66. The axial spacing through which the cooling passage extend may decrease due to the forces and temperature cycles that occur during operation of the engine and the cooling air is subsequently cut off. As a result, the fuel nozzle guides must be replaced and any damage to the bulkhead must be repaired.

In addition, the movement of parts associated with the fuel nozzle 34, such as the anti-rotation elements, on the fuel nozzle guide support 68, during engine use causes wear on the anti-rotation element, such that the anti-rotation element may be replaced, and wear such that the support may be repaired. The present invention focuses on a method of repairing the combustion chamber assembly.

Typically, the combustion chamber assembly 32 will come to a repair department without the fuel nozzle guides 64 and the inner combustion chamber wall 42. If the fuel nozzle guides are present, they are machined off the bulkhead 58. If the inner wall 42 is in place, the rivets holding the inner wall are machined off and the inner wall is removed. The remainder of the combustion chamber assembly is referred to as the hooded bulkhead portion of the combustion chamber assembly 32a.

The present invention is an apparatus for use in a method for repairing the hooded bulkhead portion of the combustion chamber assembly 32a. The method includes the following steps. As shown in FIG. 6, the first step is to support the hooded bulkhead portion of the combustion chamber assembly on the repair apparatus 78. This step includes centering the center plate member 90 on the means for rotating the combustion chamber assembly, such as a turn table 112, by placing the center plate member on the turn table and extending the locating cylinder 105 through the center plate member and the hole 114 in the turn table.

Then, the base plate 86 with the means for indexing 88 attached is centered on the center plate member 90 by placing the base plate on the center plate member and extending the locating cylinder 105 through the indexing plate 102, the center plate member 90 and the turn table 112.

The next step is to center the hooded bulkhead portion of the combustion chamber assembly 32a on the support assembly 82. This includes the steps of engaging the lug mountings 48 with the locating pins 98 and adjusting the location of the hooded bulkhead portion of the combustion chamber assembly on the support assembly until it is concentric with the support assembly. The locating pins and the dial indicator 118 are utilized. The dial indicator is disposed adjacent to the hooded bulkhead portion of the combustion chamber assembly on a fixed support, such as the laser positioning structure, and runs on the inner surface 59 of the inner ring 56 of the bulkhead assembly 54.

The next step is to separate the hooded bulkhead portion of the combustion chamber assembly 32a into at least two separate elements, one of which is the bulkhead 58. Separating the bulkhead 58 includes the steps of causing two separations by making a separation cut on the bulkhead at an inner cut-line 70 and an outer cut-line 72. Using a laser beam 115 results in a separation cut of between about six (6) thousandths of an inch in width to about eight (8) thousandths of an inch in width. Other embodiments may employ, for example, a water-jet having a separation cut of about thirty (30) thousandths to forty (40) thousandths of an inch in width or a plasma cutting system having a separation cut of about sixteen (16) thousandths of an inch in width.

As shown in FIG. 5, the steps for causing the separation include marking the reference lines 73 on the bulkhead 58, the inner ring 56 and the outer ring 57 of the bulkhead assembly 54. As shown in FIG. 6, the laser beam 115 (Lumonics Corporation Laserdyne Model #780) is positioned for removing material along the inner separation area 70 at the first radial position $R_1$ and the outer separation area 72 at the second radial position $R_2$. The laser operates at a speed that is dependent on the material thickness of the bulkhead and a power setting that penetrates through the bulkhead material and avoids thermal distortions of adjacent surfaces or destructive exit damage to the hood 46. The laser is particularly adapted for this function.

The laser nozzle assembly 117 has a lens which focuses the energy from the laser beam so that the maximum energy discharge occurs at the bulkhead and the energy dissipates at locations beneath the bulkhead. Thus, after removing material through a rotation of three hundred and sixty (360) degrees along the inner separation area and the outer separation area the laser beam does not remove material from the hood or other structures. In addition the focal point of the laser beam coupled with the minimal heat discharged from the laser beam allows surfaces adjacent to the separation regions to experience minimal thermal distortions.

It is vital when utilizing the repair apparatus 78 which supports the combustion chamber assembly by the lug mountings 48 that during the cutting operation the transverse forces on the lug mountings are minimal and, preferably the resultant forces on the lug mountings put the lug mountings in compression. As discussed earlier, the lug mountings are weak in shear. Thus, the lug mountings may be unable to oppose the transverse forces of a cutting device which exerts significant transverse forces and as a result the lug mountings may snap during a circumferential cutting operation. However, the laser beam imparts minimal transverse forces on the combustion chamber assembly during the circumferential cutting operation, so the lug mountings may not break.

In addition, the repair apparatus must hold the combustion chamber assembly securely during the cutting operation. Unlike the cutting wheel, the laser imparts minimal forces in the form of stress and vibration so the repair apparatus holds the combustion chamber securely. These forces do not make the combustion chamber assembly so unsteady on the repair apparatus that cutting is not possible.

Other embodiments of the present invention may utilize a variety of cutting devices other than the laser. One such device is the hand held air grinding apparatus with a cutting wheel. This is the conventional tool used to remove the hood in the prior art method and may be utilized here. Also, burrs may be utilized with the cutting wheel to improve this embodiment. Another device is a water-jet cutting system, with an abrasive agent in the water if necessary to cause the separation between cut surfaces. Some substance, such as foam, must be interposed between the jet and the hood in order to prevent the jet from causing destructive exit damage to the hood. Another possibility is a plasma cutting system that can be likened to a refined torch; however, some substance must be interposed between the plasma cutting system and the hood in order to prevent destructive exit damage to the hood. Another possibility is an electrical discharge machining device that utilizes an electrode to make the separations. Also, a lathe with a single point parting tool or a milling machine with a conventional milling cutter may be used. The term "cutting device," encompasses not only these embodiments, but includes any device which could make the cut without damaging the hood, the adjacent surfaces or the lug mountings while the repair apparatus is able to hold the combustion chamber assembly securely.

Once separating is complete, the next step is to repair the bulkhead 58 and the hooded portion of the combustion chamber assembly 32b independently. This step includes removing the bulkhead from the hooded bulkhead portion of the combustion chamber assembly 32a, removing the remaining hooded portion of the combustion chamber assembly from the repair apparatus 78, and repairing the bulkhead and the hooded portion of the combustion chamber assembly as necessary by the required specialists. Typically repair of these parts includes refurbishing any of the following the anti-rotation elements, the supports 68 for the fuel nozzle guides 64, the bulkhead 58 the outer wall 44 or any other item which requires repair.

As shown in FIG. 8, the last step is to reattach the bulkhead 58 to the hooded portion of the combustion chamber assembly 32b which includes the following steps. First, the hooded portion of the combustion chamber assembly is supported on the repair apparatus 78 by engaging the locating pins 98. The bulkhead 58 is positioned flush with the portion of the bulkhead surface on the hooded portion of the combustion chamber assembly utilizing the reference lines 73 and the plugs 124. The bung plate 122 is forcefully disposed inside the hooded portion of the combustion chamber assembly adjacent to the inner surface 59 of the inner ring 56 of the bulkhead assembly 54. The bung plate is located to maintain the circular shape of the inner diameter of the combustion chamber assembly 32 and the concentricity of the combustion chamber assembly during the repair operation. Copper chill plates are inserted in the openings 62 for the fuel nozzles 34. The next steps are tack welding along the inner circumference of the cut surface of the bulkhead, then tack welding along the outer circumference of the cut surface of the bulkhead.

The order of many of the steps is not significant. One exception is the order of the tack welding steps. Each of the two cut surfaces of the bulkhead must be joined to a corresponding surface attached to the hooded portion of the combustion chamber assembly 32b. The inner circumference of the bulkhead is attached adjacent to the inner ring 56 and the outer circumference of the bulkhead is attached adjacent to the outer ring 57 of the bulkhead assembly 54. If welding of the outer circumference were to take place before welding of the inner circumference, the inner edge of the bulkhead would drop below the adjacent surface of the hooded portion of the combustion chamber assembly due to distortions of the bulkhead that accompany welding. Welding the inner circumference after welding the outer circumference would require a welder to simultaneously lift up the bulkhead, so the inner circumference is flush with the adjacent surface, and weld. Holding up the bulkhead and welding is difficult. When the inner circumference is welded first, the outer circumference distorts in a manner such that the outer edge of the bulkhead raises above the adjacent surface of the hooded portion of the combustion chamber assembly. Welding the outer circumference after welding the inner circumference would require the welder to simultaneously hold down the bulkhead, so the outer circumference is flush with the adjacent surface, and weld. Holding down the bulkhead and welding is relatively easy. Accordingly, it is recommended that tack welding proceed from the inner circumference to the outer circumference.

The welding need not be completely finished at the inner circumference before proceeding to the outer circumference. Good results were obtained by providing a tack welds about one-quarter (0.25) of an inch to about one-half (0.50) of an inch apart around the inner circumference. Then tack welds are provided about one-quarter (0.25) of an inch to about one-half (0.50) of an inch apart around the outer circumference. The following steps were to weld about four (4) inch to six (6) inch strips around the inner circumference at staggered locations and to weld the remainder of the inner circumference. Only the remainder of the inner circumference need be welded since the staggered weld strips are quality welds of the appropriate penetration. The remaining steps were to weld about four (4) inch to six (6) inch strips around the outer circumference at staggered locations and to weld the remainder of the outer circumference. Only the remainder of the outer circumference need be welded since the staggered weld strips are quality welds of the appropriate penetration. Although the plugs 124 allow the bulkhead angle a, as shown in FIG. 4, to be roughly correct welding distorts the angle somewhat. Because this angle is so critical to the life of the engine, the next step is to mechanically manipulate the combustion chamber assembly 32 to restore the original bulkhead angle a.

The step of manipulating the combustion chamber assembly 32 to restore the bulkhead angle a is an independent operation. The combustion chamber assembly is removed from the repair apparatus 78 and placed on a hydraulic cylinder and ram. A plate having a contour, such that the edges are chamfered and polished smooth so that the plate fits into the inner diameter of the combustion chamber assembly, is placed inside the combustion chamber assembly and pulled downward until the relationship between the bulkhead and the lug mountings, as represented by the bulkhead angle a, is restored.

The present invention has several advantages over the prior art holding apparatuses. A primary advantage of the present invention is the efficiency and ease of a repair operation which results from supporting and rotating the combustion chamber assembly 32 using a repair apparatus 78 which engages the lug mountings 48. The repair operation is easier because by engaging the lug mountings the repair apparatus engages the datum for the part. Even though the repair operation calls for the removal of the combustion chamber assembly from the repair apparatus, after the repair operation there is no need to reference the part because it is referenced by merely placing it back on the repair apparatus. The efficiency of the repair operation is also increased if the lug mountings 48 are utilized to support the combustion chamber assembly 32. Using the lug mountings in this way allows the bulkhead 58 to be properly positioned. During reattachment if the bulkhead is not returned to the exact circumferential orientation from which it came, the attachment surfaces of the bulkhead may not match the surfaces of attachment adjacent to the inner ring and the outer ring on the second portion of the combustion chamber assembly. Therefore, the reattachment process will be complicated by requiring addition of filler to the bulkhead in some regions and machining of the bulkhead in other regions to attempt to fit the bulkhead into the combustion chamber assembly.

Another advantage is the enhanced durability and efficiency of the engine 20 because the configuration of the repaired combustion chamber assembly 32 is comparable to that of the original configuration. This results from the repair apparatus 78 positioning the bulkhead 58 properly and from the apparatus maintaining the circular form and concentricity of the inner diameter of the combustion chamber assembly during welding of the bulkhead. The repair apparatus assures the proper alignment of the bulkhead by aligning the bulkhead exactly circumferentially and roughly angularly.

The bulkhead 58 must be returned to the exact circumferential orientation that it had prior to separation from the combustion chamber assembly. Each annular bulkhead has a special circumferential profile due to the distortions that accompany ordinary life of an engine. Inaccurate circumferential alignment of the bulkhead may have graver consequences, than decreasing the efficiency of the repair operation.

Circumferential alignment is important to engine life, because the fuel nozzles 34 extend through the hood and the bulkhead at a predetermined angle. It is critical to the operative life of the walls of the combustion chamber assembly 32 and the turbine that the angle of each fuel nozzle in relation to the bulkhead 58 remains within predetermined limits. If the circumferential alignment of the reinstalled bulkhead is incorrect, the alignment of the fuel nozzles may be compromised.

Alignment is achieved utilizing the reference lines 73 on the bulkhead assembly and the plugs 124 of the repair apparatus. The reference lines assure that the annular bulkhead is placed back in the combustion chamber assembly in its original position. The plugs assure that the alignment of the openings in the bulkhead have the proper relationship with the openings in the hood so that the fuel nozzles extending through the bulkhead have the proper angle.

Angular alignment need only be approximate. When the bulkhead 58 is formed it is pressed in a die so that it has a predetermined bulkhead angle. During assembly of a new engine, the bulkhead is welded to the inner ring 56 and the outer ring 57 of the combustion chamber assembly to make up the bulkhead assembly with an angle a. The manufacturing process of the combustion chamber assembly continues with the outer ring of the angular bulkhead assembly being welded to the outer wall of the combustion chamber assembly; the combustion chamber hood being welded to the outer ring of the bulkhead assembly; and the inner wall being riveted to a flange portion of the bulkhead assembly. The repair apparatus 78 approximately positions the bulkhead back at the original bulkhead angle between the inner ring and the outer ring by giving the plug holes an angle parallel with the bulkhead angle.

The angular positioning need only be approximate because current methods of mechanical manipulation of the combustion chamber assembly can restore the bulkhead angle a accurately. Once the bulkhead angle is roughly correct, the maximum amount of manipulation achieved by a shop has been about one hundred thousandths (0.001) of an inch in manipulation of the bulkhead to correct the bulkhead angle.

As a part of reattachment, the bulkhead is welded back between the inner ring and the outer ring of the combustion chamber assembly. Welding causes temperature differentials along the surfaces adjacent to the weld. These temperature differentials may cause the bulkhead and the inner ring to distort in a non-circular fashion that must be stopped. In addition, the distortions may cause the combustion chamber assembly to no longer be concentric, because the distortion of the inner ring may shift the axis of symmetry of the inner ring away from the axis of symmetry of the entire combustion chamber assembly. Both of these phenomena may have detrimental effects on the efficiency of the combustion chamber assembly.

The distortions may disrupt the flow of air which is vital to the cooling of the assembly. When air flow is disrupted, the amount of cooling around the annular combustion chamber assembly varies and causes the temperature within the combustion chamber assembly to change. The temperature differential causes variations in the temperature profile for the high turbine inlet that can lead to premature failure of the turbine rotor blades and stator vanes. The bung plate of the repair apparatus maintains the circular form and concentricity of the inner diameter of the combustion chamber assembly during welding of the bulkhead.

In particular, an advantage is the durability of the repaired combustion chamber assembly 78 which results from using the repair apparatus with the cutting operation which avoids stressing the lug mountings 48 to the extent which causes their deformation or destruction. By reducing the stress on the lug mountings during the repair operation the lug mountings are less likely to break and the engine will operate with the designed number of lug mountings extending from the combustion chamber assembly.

Yet another advantage of the present invention is decreasing the time and effort necessary to secure the combustion chamber assembly 32 to the repair apparatus 78 for cutting as compared to the time and effort necessary to secure the combustion chamber assembly for cutting utilizing the prior art apparatus, the hydraulic sizing cluster. Recall, the set-up of the sizing cluster is time consuming and difficult, because using the sizing cluster requires working with many small parts. However, the set-up of the combustion chamber assembly utilizing the repair apparatus location pins is relatively easy, and thus saves time.

Although the invention has been shown and described with respect to detailed embodiments thereof, it should be understood by those skilled in the art that various changes in form and detail thereof may be made without departing from the spirit and the scope of the claimed invention.

We claim:

1. A repair apparatus for removing and installing an annular bulkhead during a repair operation for a combustion chamber assembly having an axis of symmetry, an inner wall, an outer wall, the annular bulkhead extending between the walls, a hood capping the bulkhead and a plurality of lug mountings which extend from the hood, the lug mountings having a design limit for shear and bending force loads, which comprises:
   (a) a cutting device which is removable from the repair apparatus having
      (1) means for cutting the bulkhead having
         (i) a transverse force characteristic, and
         (ii) a vertical force characteristic, under operative conditions
      (2) a positioning structure for the means for cutting the bulkhead having
         (i) a first radial position with respect to the axis of the combustion chamber assembly at which the means for cutting is supported and which coincides with an inner separation region on the bulkhead, and
         (ii) a second radial position with respect to the axis of the combustion chamber assembly at which the means for cutting is supported and which coincides with an outer separation region on the bulkhead,
         (iii) the positioning structure being movable between the first radial position and the second radial position;
   (b) a support assembly having
      (1) a base plate, and,
      (2) means for engaging the lug mountings extending from the base plate at predetermined circumferentially spaced locations and orienting the separation regions with respect to the first radial position and the second radial position; and,
   (c) means for rotating the support assembly about the axis of symmetry of the combustion chamber assembly;
   wherein the transverse force characteristic is less than the vertical force characteristic of the means for cutting under operative conditions and the transverse force characteristic exerts a resultant force in shear and bending which is less than the design limit of the lug mountings.

2. The repair apparatus of claim 1, wherein during installation of the bulkhead the support assembly further includes means for angularly and circumferentially indexing the bulkhead with respect to an adjacent structure of a portion of the combustion chamber assembly.

3. The repair apparatus of claim 2, wherein the means for indexing the bulkhead further includes an indexing plate having a plurality of holes extending through the plate at some predetermined angle, a plurality of plugs being positionable in the plug holes and a center hole which adapts the means for indexing the bulkhead for receiving a locating cylinder.

4. The repair apparatus of claim 3, wherein the plurality of plug holes further includes a predetermined angle parallel to the original bulkhead angle.

5. The repair apparatus of claim 1, wherein during installation of the bulkhead the repair apparatus further includes means for cylindrically supporting the combustion chamber assembly being disposed inside the combustion chamber assembly to maintain the concentricity of the inner ring of the combustion chamber assembly and to minimize the distortions of the bulkhead during a welding operation.

6. The repair apparatus of claim 1, wherein the cutting device further includes means for cutting the combustion chamber assembly which is a laser beam.

7. An apparatus for removing and installing the bulkhead about an axis of symmetry of a combustion chamber assembly during a repair operation for the hooded bulkhead portion of the combustion chamber assembly having an inner combustion chamber wall, an outer combustion chamber wall, a bulkhead extending between the two walls, and a combustion chamber hood which extends from the inner ring to the outer ring in a u-shape capping the combustion chamber assembly, the hood having a plurality of integral lug mountings, the lug mountings having a design limit for shear and bending force loads, which comprises:
  (a) a cutting device having
    (1) means for cutting a bulkhead having
      (i) a transverse force characteristic, and
      (ii) a vertical force characteristic,
    (2) a support structure for the means for cutting having
      (i) a first radial position with respect to the axis of the combustion chamber assembly at which the means for cutting is supported and which coincides with an inner separation region on the bulkhead, and
      (ii) a second radial position with respect to the axis of the combustion chamber assembly at which the means for cutting is supported and which coincides with an outer separation region on the bulkhead,
      (iii) the support structure being movable between the first radial position and the second radial position;
  (b) a support assembly having
    (1) a base plate having
      (i) an outer rim of the base plate which extends upwardly perpendicular to the base plate, the rim having a plurality of pin holes which extend through the outer rim radially and parallel with the base plate, and
      (ii) a plurality of locating pins which extend radially inwardly through the pin holes in the base plate and adapt the locating pins for engaging the lug mountings;
    (2) a means for indexing the bulkhead attaches to the base plate, and is disposed concentrically on the base plate and spaced radially inwardly from the outer rim of the base plate which adapts the support assembly to receive the lug mountings,
  (c) a rotator assembly having
    (1) a means for causing the relative rotation of the support assembly with respect the cutting device, and
    (2) having a hole for receiving the locating cylinder;
  (d) a bung plate being disposable on the inside of the combustion chamber assembly adjacent to the inner ring and above and concentric to the support assembly
  (e) a locating cylinder being disposable through the support assembly and being supportable by the rotator assembly;
  wherein the transverse force characteristic is less than the vertical force characteristic of the means for cutting under operative conditions and the transverse force characteristic exerts a resultant force in shear and bending which is less than the design limit of the lug mountings,
  wherein the base plate and the indexing plate have a plurality of holes which adapt the support assembly for attachment to a rotator assembly,
  wherein the base plate and the indexing plate of the support assembly each having a plurality of lifting holes which are disposed around the circumference of each plate for moving the apparatus and the combustion chamber assembly from position to position,
  wherein the indexing plate has a center hole which adapts the indexing plate for receiving a locating cylinder.

8. An apparatus for removing and installing the bulkhead about an axis of symmetry of a combustion chamber assembly during a repair operation for the hooded bulkhead portion of the combustion chamber assembly having an inner ring, an outer ring, a bulkhead extending between the two rings, an outer combustion chamber wall extending downstream from the outer ring, and a combustion chamber hood which extends from the inner ring to the outer ring in a u-shape capping the combustion chamber assembly, the hood having a plurality of integral lug mountings, the lug mountings having a design limit for shear and bending force loads, which comprises:
  (a) a cutting device having
    (1) means for cutting a bulkhead having
      (i) a transverse force characteristic, and
      (ii) a vertical force characteristic,
    (2) a support structure for the means for cutting having
      (i) a first radial position with respect to the axis of the combustion chamber assembly at which the means for cutting is supported and which coincides with an inner separation region on the bulkhead, and
      (ii) a second radial position with respect to the axis of the combustion chamber assembly at which the means for cutting is supported and which coincides with an outer separation region on the bulkhead,
  (b) a support assembly having
    (1) a base plate having
      (i) a center opening which extends downwardly through the base plate and adapts the base plate for rotation about the axis, (ii) an outer rim of the base plate which extends upwardly perpendicular to the base plate, the rim having a plurality of pin holes which extend through the outer rim radially and parallel with the base plate, and (iii) a plurality of locating pins which extend radially inwardly through the pin holes in the base plate and adapt the locating pins for engaging the lug mountings;

(2) a means for indexing the bulkhead having (i) an indexing plate which attaches to the base plate, which is disposed concentrically on the base plate and spaced radially inwardly from the outer rim of the base plate which adapts the support assembly to receive the lug mountings, (ii) a plurality of plug holes which are disposed around the circumference of the indexing plate which adapt to have an angle parallel with an original angle of the bulkhead for orienting the bulkhead and a depth for aligning the bulkhead with the surface adjacent to the bulkhead which remained attached to the (second portion of the) combustion chamber assembly, (iii) a plurality of plugs which engage the plug holes of the indexing plate for orienting and aligning the bulkhead in the reassembly of the combustion chamber assembly each plug having a hand knob which extends outwardly from the plug for removing the plug from the indexing plate, (3) center plate member having (i) locating surfaces which engage the base plate for centering the base plate with the means for indexing the bulkhead attached, and (ii) a diameter which insures the engagement with the base plate opening is a slip fit, (b) a rotator assembly having (1) means for causing the relative rotation of the support assembly with respect the cutting device, and (2) a hole for receiving the locating cylinders (c) a bung plate having (1) a diameter which locates on the inside of the combustion chamber assembly adjacent to the inner ring and above and concentric to the support assembly, and (2) several holes disposed around the circumference of the bung plate which adapt for a device for inserting and removing the bung plate from the combustion chamber assembly;

(d) a locating cylinder being disposable through the support assembly and being supportable by the rotator assembly;

wherein the transverse force characteristic is less than the vertical force characteristic of the means for cutting under operative conditions and the transverse force characteristic exerts a resultant force in shear and bending which is less than the design limit of the lug mountings, wherein the base plate and the indexing plate have a plurality of holes which adapt the support assembly for attachment to a rotator assembly, wherein the base plate and the indexing plate of the support assembly each having a plurality of lifting holes which are disposed around the circumference of each plate for moving the apparatus and the (portion of the) combustion chamber assembly from position to position, wherein the indexing plate and the center plate of the support assembly each having a center hole which adapts the indexing plate for receiving a locating cylinder through the two plates.

* * * * *